United States Patent
Kempter

[11] Patent Number: 5,609,831
[45] Date of Patent: Mar. 11, 1997

[54] MACHINE FOR PRODUCING A CROSS-LINKED EXTRUDED PRODUCT

[75] Inventor: Werner Kempter, St. Margrethen, Switzerland

[73] Assignee: Bernhard Rustige GmbH & Co. Kommanditgesellschaft, Bremen, Germany

[21] Appl. No.: 211,915
[22] PCT Filed: Aug. 17, 1993
[86] PCT No.: PCT/CH93/00204
  § 371 Date: Jun. 28, 1994
  § 102(e) Date: Jun. 28, 1994
[87] PCT Pub. No.: WO94/04339
  PCT Pub. Date: Mar. 3, 1994

[30] Foreign Application Priority Data

Aug. 20, 1992 [DE] Germany ............... 42 27 542.3

[51] Int. Cl.⁶ ............... C08F 2/00; B01F 5/04; B29C 47/38; B29C 9/206
[52] U.S. Cl. ............... 422/135; 422/131; 422/137; 422/229; 366/155.2; 366/169.1; 366/181.1; 264/211.21; 264/211.23; 425/146
[58] Field of Search ............... 422/131, 134, 422/135, 137, 229; 366/76, 150.1, 150.2, 154.1, 155.1, 155.2, 157.1, 157.4, 167.1, 168.1, 165.3, 165.4, 170.4, 172.1, 172.2, 173.1, 177.1, 181.1, 167.2, 169.1, 170.3; 264/174, 209.6, 209.8, 211, 211.21, 211.23, 211.24; 425/86, 97, 146, 205

[56] References Cited

U.S. PATENT DOCUMENTS

| | | | |
|---|---|---|---|
| 3,378,235 | 4/1968 | Udy et al. | 366/188.1 X |
| 3,647,493 | 3/1972 | Gresch et al. | |
| 3,838,976 | 10/1974 | Bosch | 366/167.1 X |
| 3,985,345 | 10/1976 | Jakob | 259/8 |
| 4,323,314 | 4/1982 | Kaiser-wirz | 366/167 |
| 4,363,784 | 12/1982 | Hilbig et al. | 422/134 |
| 4,370,302 | 1/1983 | Suzuoka et al. | 422/137 |
| 4,778,280 | 10/1988 | Brazelton | 366/136 |
| 4,937,034 | 6/1990 | Sewell | 264/349 |

FOREIGN PATENT DOCUMENTS

| | | | |
|---|---|---|---|
| 0309410 | 9/1988 | European Pat. Off. | B29C 47/10 |
| 1506697 | 12/1967 | France. | |
| 1550464 | 12/1968 | France. | |
| 2281786 | 12/1976 | France. | |
| 3125396 | 1/1983 | Germany | B01F 3/12 |
| 679564 | 3/1992 | Switzerland | B29C 43/02 |
| 710162 | 6/1954 | United Kingdom. | |

Primary Examiner—Christopher Kim
Attorney, Agent, or Firm—Baker, Maxham, Jester & Meador

[57] ABSTRACT

A machine for producing extruded products of polymers that are cross-linked by adding at least one additive in a polymerization reaction. A feed hopper for plastic granules is coupled to a mixing container which is formed with side ports to admit the desired additives. Mixing is accomplished in a mixing container and the mixed ingredients are fed to an extruder.

15 Claims, 2 Drawing Sheets

MACHINE FOR PRODUCING A CROSS-LINKED EXTRUDED PRODUCT

BACKGROUND

1. Field of the Invention

This invention relates generally to a machine for producing extruded products, and more particularly to a machine for producing polymers that are cross-linked by adding at least one additive in a polymerization reaction.

2. Description of the Related Art

Machines for producing cross-linked extruded products are known, for example, from German patent 2,554,525, where it is designed as a screw extruder into which the polymer is fed through a feed hopper. The other ingredients that must be added to the polymer are usually injected in liquid form into the lower portion of the feed hopper or directly into the neck part of the extruder of this type of machine.

For complete and uniform cross-linking of polymers, it is crucial for adequate mixing of all ingredients to be achieved. However, this is precisely one of the main disadvantages of the known type of equipment. By merely injecting certain ingredients into the polymer, which is in the extruder feed hopper or in the neck of the extruder, a high additive concentration is achieved only in the area around the injection site. The reaction mixture must then be blended again during homogenization by means of an extruder worm gear with a complicated design as part of the extruder. In addition to the resulting unfavorable conditions for good cross-linking, this requires an extruder with a complex design that can be manufactured only at great expense.

SUMMARY OF THE INVENTION

The primary purpose of the present invention is to create a machine which permits better mixing of the ingredients of the reaction mixture and is less expensive to manufacture than known machines.

An essential feature of the machine according to this invention is that an additional mixing device for premixing all the ingredients of the reaction mixture is provided between the feed device for the plastic granules (polymer) and the extruder. It is especially advantageous here that all the ingredients of the reaction mixture are combined in a container suitable for this purpose, namely the mixer, and are blended together thoroughly until finally an optimum blend of the reaction mixture can be fed to the extruder.

This optimum blending of the ingredients of the reaction mixture also has a positive effect on the efficiency of the extruder as a whole, so the extruder screw required for the production process in the past, having a length/diameter ratio of 30×D can, according to this invention, be replaced by an extruder with a length/diameter ratio of 26×D. This lightweight extruder lowers the manufacturing cost of the system as a whole.

According to a preferred embodiment of the mixing device according to this invention, mixing takes place in the vertical direction. For this purpose, the mixing device has a central inlet for the plastic granules located at the top in the vertical direction and at least one feed device for an additive located on the side of the mixing device. The additive is injected horizontally through this additive feed port into the flow of granules entering vertically from above. Injection of one or more additives at right angles to the flow of the polymer results in a preliminary mixing of the ingredients of the reaction mixture by means of the flow effect. This is especially so when these feed devices are arranged in the upper area of the mixer, and then after the ingredients of the reaction mixture have filled the interior volume of the mixer from the bottom, they are mixed mechanically a second time with the help of a stirring rod.

The first phase of mixing can be optimized further by arranging the stirring rod coaxially by means of struts running radially from the rod to the mass flow of the incoming plastic granules. With such a stirring rod arrangement, the individual granular particles strike the mounting struts and the stirring rod and thus enter the interior of the mixer with a high degree of turbulence, so the additives injected horizontally are better able to wet the turbulent granular particles. At the same time this reduces the mechanical stirring time required for the reaction mixture.

The vertical design of the mixing device yields the additional advantage that several feed devices for additives can be provided over the perimeter of the mixer at the same time. Flange attachment of the respective metering units is facilitated by the excellent accessibility of the mounting flange located on the side of the mixer.

BRIEF DESCRIPTION OF THE DRAWING

The objects, advantages an features of this invention will be more clearly understood from the following detailed description, when read in conjunction with the accompanying drawing, wherein.

DETAILED DESCRIPTION OF THE PREFERRED EMBODIMENTS

Figure 1:
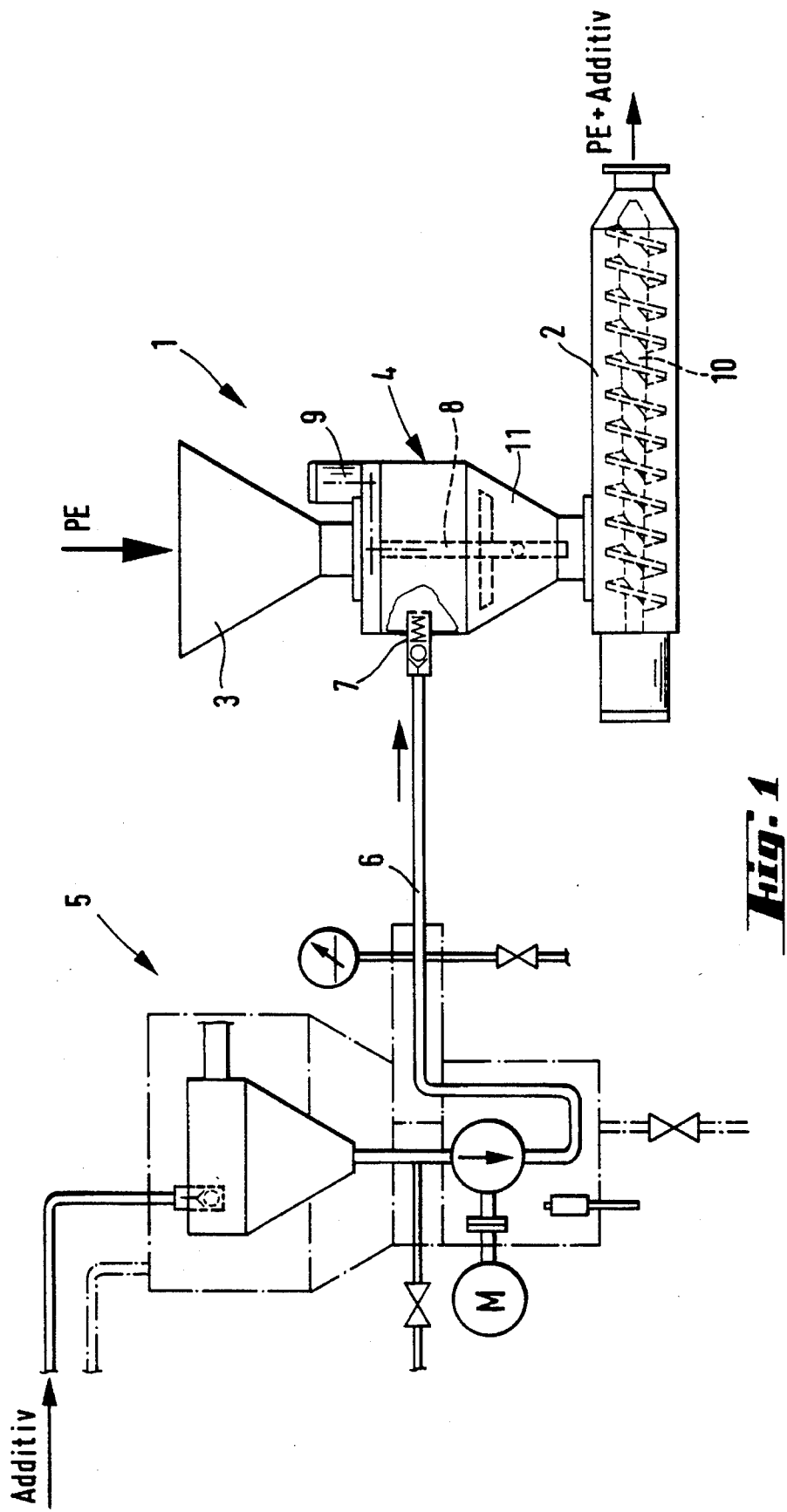
FIG. 1 is a schematic diagram of the machine according to this invention.

With reference now to the drawing, FIG. 1 shows schematically the design of extruding machine 1 according to this invention. Screw extruder 2 and feed hopper 3 for the polymer granules (PE) are arranged above the extruder, where the feed hopper opens into mixer 4 which is located between feed hopper 3 and the extruder. Furthermore, in this mixer, a feed line for an additive (here, for example, silane solution) comes from metering pump unit 5 and also opens into the interior of mixer 4 through injection nozzle 7.

Stirring rod 8, which is driven by means of drive 9 and is described in detail below, is provided inside mixing container 4. Screw extruder 2 is a known extruder for extrusion of plastics and has a total screw length-to-diameter ratio of approximately 26:1 but will not be described further here. The plastic reaction mixture to be processed is already optimally premixed when it is fed into the screw extruder directly from the mixer located above the screw extruder.

Figure 2:
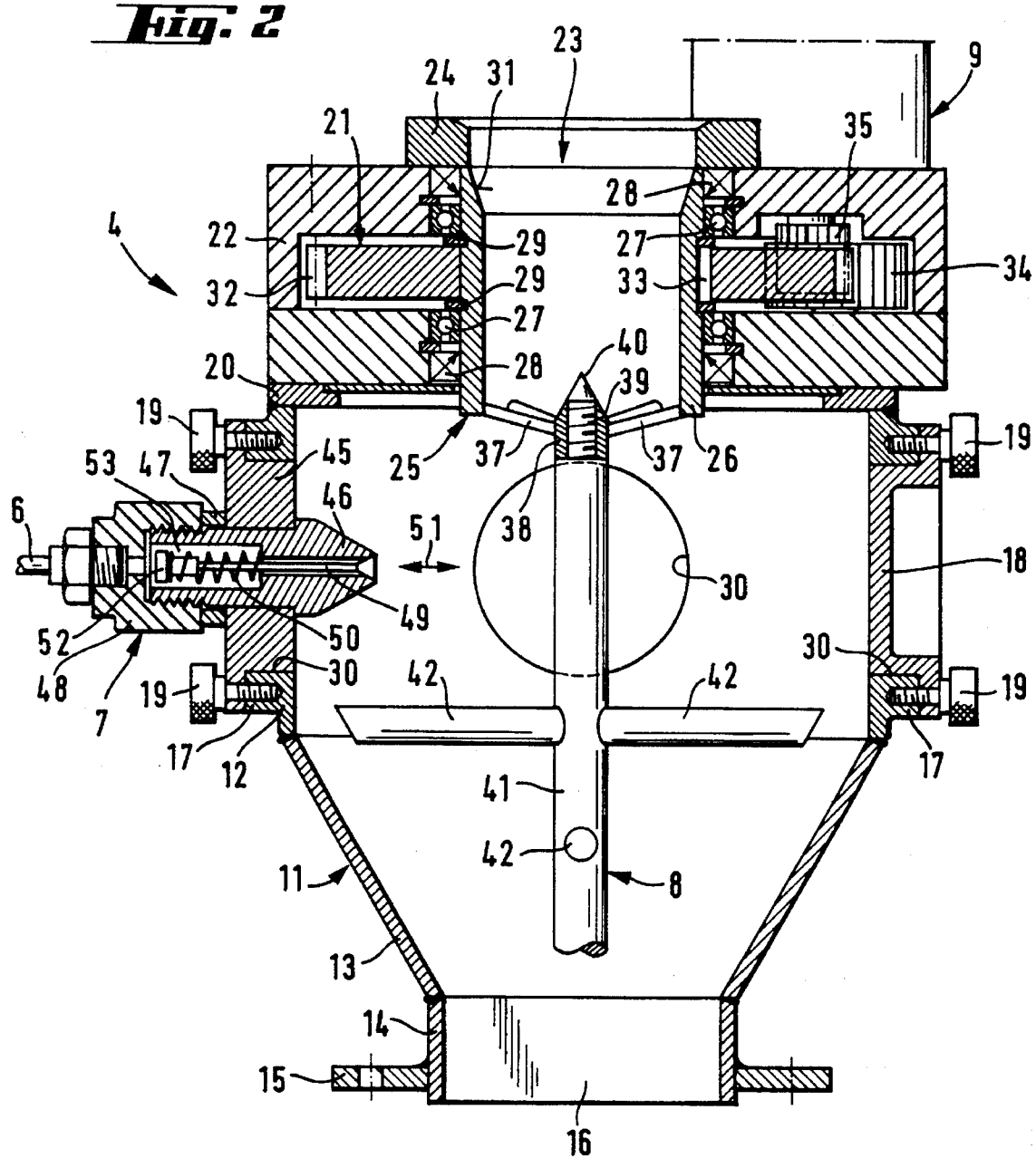
FIG. 2 shows a longitudinal sectional view through the mixing device according to this invention.

With reference to FIG. 2, mixer 4 consists essentially of a mixer housing 11 which is open at the top and consists of top part 12 and bottom part 13. Bottom part 13 is permanently welded to top part 12 and is in the form of a square hopper that tapers toward the bottom. Square tube section 14, which is also part of flange 15, is mounted on the lower side of bottom part 12. Flange 15 is arranged on the outside of square tube 14 at a distance from the lower edge of the tube such that a small section of square tube 14 projects beyond the otherwise flat lower side of flange 15 which serves as a centering device when mixer 4 is flange-mounted on screw extruder 2.

Top part 12 of mixer housing 11 is also designed as a square tube, so a feed port 30 together with a mounting flange 17 is provided on each of the four side faces. Preferably feed devices or injection nozzles 7 for additives that are to be added to the reaction mixture are flange-mounted to these flanges and can be secured by means of screws. If less than four feed ports 30 are needed, they can be sealed by screwing plate 18 over each of them.

The cross-sectional area of top part 12 which is open at the top has flange ring 20 that is permanently connected to top part 12 and has gear 21 resting on it. Gear 21 is part of drive 9 for stirring rod 8 and at the same time also forms the upper end of mixer housing 11.

Gear 21 consists of an essentially square gear box 22 having vertical bore 23 that serves as the inlet for the PE granules. This inlet 23 is bordered by cylindrical connection 24 on the top side of gear box 22. This cylindrical connection serves as a centering device for feed hopper 3 which is flange-mounted on the top side of mixer 4. Inlet port 23 also serves as the hub for stirring rod mount 25 which is coaxial with inlet 23 and is built into it.

This mount 25 includes cylinder 26 that is mounted so it can rotate about the longitudinal axis of the cylinder by means of ball bearing 27 and appropriate seal 28 in inlet 23 of gear box 22. Cylinder 26 forms the hollow shaft for spur-toothed wheel 32 of stirring rod drive 9. This spur-toothed wheel is fixed in its axial direction by retaining rings 29 and in the circumferential direction by feather keys 33. Gear wheel 34, which in turn engages with pinion 35 of an electric motor (not shown), meshes with the spur-toothed wheel. Depending on the diameter and number of teeth in the respective gear wheels, the desired transmission of the motor speed can be established in order to adjust the intensity of the mixing effect achieved by stirring rod 8.

Chamfer 31 is provided on the upper end of cylinder 26 on the inside diameter of the cylinder and is supposed to prevent the PE granules coming through inlet 23 from striking the front edge of the cylinder, which could result in blockage in the feed area. Webs or struts 37 hold threaded nut 38 which is coaxial with the center axis of the cylinder and are mounted in the radial direction on the side of cylinder 26 facing the interior of the mixer container. These struts randomly deflect the granular PE particles entering the mixing container, causing turbulence and assisting in initial mixing action. Threaded nut 38 forms the mounting device for stirring rod 8, which can be screwed onto a matching thread on the upper end of vertical rod 41 with nut 38. The screw connection between stirring rod mount 25 and stirring rod 8 offers the advantage that stirring rods of different designs can be screwed in for use according to the composition of the reaction mixture and/or the flow rate.

In the present embodiment the stirring rod consists of vertical rod 41 to which horizontal bars 42 projecting radially outward are attached at different levels. The top horizontal bar is located beneath the feed port 30 in order to avoid interfering with the turbulence created in the area around the mouth of injection nozzle 7. These horizontal bars increase the turbulence of the entering PE granules to assist in mixing.

Injection nozzle 7 is installed in feed port 30 so it projects into the port with the help of dummy plug 45 on mounting flange 17. Nozzle 46 is inserted into a borehole in dummy plug 45 until it is in contact with one side of dummy plug 45 with an axial stop on the peripheral surface of the nozzle, and sleeve 47 is pushed onto nozzle 46 from the rear and is put under tension against dummy plug 45 with mounting nut 48. An axial borehole is cut through nozzle 46 so that valve 49 can move in the direction of arrow 51. This valve 49 is surrounded by spiral spring 50 that holds valve body 49 in the closed position in a state of rest by means of spring stop 52. Space 53 into which feed line 6 opens is provided on the rear end of nozzle 46 and the interior of mounting nut 48.

When adding additives to mixer 4, the additive coming from metering unit 5 causes a build-up of pressure in hollow space 53, such that when the pressure is great enough it presses valve 49 against the bias of spring 50 in the direction of arrow 51 toward rod 41 and thus opens the nozzle. In this operating mode, the additive(s) can be injected into the inside of mixer 4. If the pressure in feed line 6 is reduced so the force pressing against spring stop 52 is smaller than the spring force, the spring will move valve 49 in the opposite direction of arrow 51 away from rod 41, thus closing the nozzle. Lumping of the additive(s) around the mouth of the nozzle is prevented by the pressure-dependent opening and closing of the injection nozzle, thus assuring that only additives with a certain pressure are injected into the interior of the mixer, and thus an adequate mixing effect can be achieved.

Therefore, optimum premixing of all ingredients of a reaction mixture before they are fed to the extruder is possible for the first time with mixer 4 according to this invention, thus yielding more homogeneous cross-linking of the polymer and therefore improving the quality of the end product.

This machine is especially but not exclusively suitable for producing extruded products of polymers that are cross-linked in a silanol condensation reaction in an extruder by adding a hydrolyzable unsaturated silane, at least one substance that releases free radicals and at least one catalyst.

In view of the above description, modifications and improvements will likely occur to those skilled in the art which are within the scope of the appended claims.

What is claimed is:

1. A machine for producing extruded products of polymers that are cross-linked by adding at least one additive to plastic granules in a polymerization reaction, said machine comprising:

a vertically disposed mixing container with a vertical central axis and having an upper end and a lower end;

a rotatably mounted cylinder arranged vertically at said upper end and having a central vertical bore defining an inlet to said mixing container for the plastic granules at said upper end;

a feed hopper for introducing the plastic granules into said container at said upper end;

feeding means in the side of said mixing container for feeding additives transverse to said central axis into said container, said feeding means comprising a pressurized source of additives, an injection nozzle connected to said source and including a pressure responsive check valve that opens or closes said injection nozzle as a function of ale pressure of the additive fed to said injection nozzle;

an extruder coupled to said lower end of said container: and mixing means including a vertical stirring rod connected to said cylinder by radial webs, said mixing means in said container between said extruder and the combined plastic granules and additive.

2. The machine recited in claim 1, wherein said mixing container includes an outlet for the reaction mixture.

3. The machine recited in claim 2, wherein said container lower end is formed with said outlet for the reaction mixture at the bottom of said mixing container, said additive feeding means comprising a plurality of feed ports transverse to said central axis on the sides of said container.

4. The machine recited in claim 3, wherein said feed ports are located at the side of said mixing container adjacent said upper end where the plastic granules enter said container.

5. The machine recited in claim 2, wherein said stirring device is configured to rotate and can be driven inside of said mixing container.

6. The machine recited in claim 1, wherein said stirring rod is positioned coaxially with said inlet, said rod having a plurality of bars spaced a distance apart, extending away from said rod and distributed over the length of said rod and over its periphery.

7. The machine recited in claim 6, said mixing means further comprising a gear for driving said stirring rod about its vertical axis.

8. The machine recited in claim 7, wherein said gear is coupled to said cylinder.

9. The machine recited in claim 8, wherein said radial webs are connected to said vertical rod so that several said stirring rods can be connected in order to adapt to the composition of the reaction mixture and/or the flow rate or throughput of said machine.

10. A machine for producing extruded products of polymers that are cross-linked by adding at least one additive to plastic granules in a polymerization reaction, said machine comprising:

a mixing container having an upper end and a lower end, a cylindrical tubular inlet rotatably mounted at said upper end;

a feed hopper for introducing the plastic granules into said tubular inlet;

feeding means in the side of said mixing container for feeding additives into said container, said feeding means comprising a pressurized source of additives, an injection nozzle connected to said source and including a pressure responsive check valve that opens or closes said injection nozzle as a function of the pressure of the additive fed to said injection nozzle;

an extruder coupled to said lower end of said container; and mixing means comprising a vertical stirring rod positioned coaxially with said tubular inlet in said container and disposed between said extruder and the combined plastic granules and additive, said mixing means connected to and rotatable with said tubular cylindrical inlet by means of radial webs.

11. The machine recited in claim 10, wherein said container upper has a vertical central axis and said additive feeding means comprising a plurality of feed ports on the sides of said container extending transverse to said axis.

12. The machine recited in claim 11, wherein said feed ports are located at the side of said mixing container adjacent said upper end where the plastic granules enter said container.

13. The machine recited in claim 11, wherein said stirring rod having a plurality of bars spaced a distance apart, extending away from said rod and distributed over the length of said rod.

14. The machine recited in claim 13, said mixing means further comprising a gear for driving said tubular inlet and said stirring rod about its vertical axis.

15. The machine recited in claim 14, wherein said vertical rod is detachably connected to said radial webs so that selected stirring rods can be connected in order to adapt to the composition of the reaction mixture and/or the flow rate or throughput of said machine.

* * * * *